US010489352B2

(12) United States Patent
Godowski et al.

(10) Patent No.: US 10,489,352 B2
(45) Date of Patent: Nov. 26, 2019

(54) SOFTWARE DISCOVERY FOR SOFTWARE ON SHARED FILE SYSTEMS

(71) Applicant: International Business Machines Corporation, Armonk, NY (US)

(72) Inventors: Piotr P. Godowski, Cracow (PL); Piotr Kania, Cracow (PL); Krzysztof Pienkowski, Cracow (PL); Artur K. Zezula, Skawina (PL)

(73) Assignee: International Business Machines Corporation, Armonk, NY (US)

( * ) Notice: Subject to any disclaimer, the term of this patent is extended or adjusted under 35 U.S.C. 154(b) by 503 days.

(21) Appl. No.: 14/942,050

(22) Filed: Nov. 16, 2015

(65) Prior Publication Data
US 2017/0141991 A1 May 18, 2017

(51) Int. Cl.
*G06F 16/182* (2019.01)
*H04L 29/08* (2006.01)
*H04L 12/24* (2006.01)
*H04L 12/26* (2006.01)

(52) U.S. Cl.
CPC ........ *G06F 16/183* (2019.01); *H04L 41/0853* (2013.01); *H04L 43/065* (2013.01); *H04L 43/0811* (2013.01); *H04L 67/1097* (2013.01); *H04L 67/34* (2013.01)

(58) Field of Classification Search
CPC ..... H04L 43/12; H04L 67/1097; H04L 67/34; G06F 17/30203
See application file for complete search history.

(56) References Cited

U.S. PATENT DOCUMENTS

| | | | | |
|---|---|---|---|---|
| 6,301,609 B1* | 10/2001 | Aravamudan | .......... | H04L 51/26 707/999.001 |
| 8,112,528 B2* | 2/2012 | Capomassi | ......... | G06F 16/2322 709/226 |
| 2002/0112182 A1* | 8/2002 | Chang | ................ | G06F 11/3495 726/6 |
| 2002/0120765 A1* | 8/2002 | Boehmke | ................ | H04L 29/06 709/231 |
| 2003/0061331 A1* | 3/2003 | Nakamura | ............ | G06F 3/0605 709/223 |
| 2003/0126236 A1* | 7/2003 | Marl | ................. | H04L 29/08846 709/220 |
| 2003/0217118 A1* | 11/2003 | Kobayashi | ........ | G06F 17/30905 709/218 |
| 2004/0254948 A1* | 12/2004 | Yao | ................... | G06F 17/30563 |

(Continued)

*Primary Examiner* — Brian J. Gillis
*Assistant Examiner* — Javier O Guzman
(74) *Attorney, Agent, or Firm* — Terrile, Cannatti & Chambers, LLP; Stephen A. Terrile

(57) ABSTRACT

A method for software discovery may be provided. The method may comprise scanning an shared resource mounted to an endpoint device for identifying installed software on the shared resource for the endpoint device, monitoring a read access to such identified installed software by the endpoint device using a monitoring agent, and marking the installed software as used on the shared resource by the endpoint device using a software asset management unit. Additionally, the method may comprise recording a last time use of the installed software by the endpoint device, and marking the installed software as uninstalled on the endpoint device after a predetermined time after the last time use.

17 Claims, 4 Drawing Sheets

(56) References Cited

U.S. PATENT DOCUMENTS

| | | | | |
|---|---|---|---|---|
| 2006/0184932 A1* | 8/2006 | Burnley | ............... | G06F 8/60 |
| | | | | 717/174 |
| 2007/0066288 A1* | 3/2007 | Soelberg | ............ | H04M 3/4931 |
| | | | | 455/415 |
| 2008/0046880 A1* | 2/2008 | Jun | ............ | G06F 8/61 |
| | | | | 717/173 |
| 2008/0133972 A1* | 6/2008 | Verbowski | ............ | G06F 21/57 |
| | | | | 714/37 |
| 2008/0154776 A1* | 6/2008 | Xia | ............ | G06F 8/60 |
| | | | | 705/51 |
| 2011/0247085 A1* | 10/2011 | Liang | ............ | G06F 21/121 |
| | | | | 726/30 |
| 2011/0270810 A1* | 11/2011 | Dinkar | ............ | G06F 11/1453 |
| | | | | 707/692 |
| 2011/0314138 A1* | 12/2011 | Kobayashi | ............ | G06F 11/3476 |
| | | | | 709/222 |
| 2012/0030427 A1* | 2/2012 | Hayakawa | ............ | G06F 12/0866 |
| | | | | 711/118 |
| 2012/0260096 A1* | 10/2012 | Balinsky | ............ | G06F 21/6209 |
| | | | | 713/176 |
| 2014/0179272 A1* | 6/2014 | Zhang | ............ | H04W 4/001 |
| | | | | 455/411 |
| 2015/0106500 A1* | 4/2015 | Fakhouri | ............ | H04L 67/34 |
| | | | | 709/224 |
| 2016/0057153 A1* | 2/2016 | Kim | ............ | H04L 63/10 |
| | | | | 726/4 |

* cited by examiner

SOFTWARE DISCOVERY FOR SOFTWARE ON SHARED FILE SYSTEMS

FIELD OF THE INVENTION

The invention relates generally to a method for software discovery, and more specifically, to an automated management of software licenses. The invention relates further to a related software discovery system and a computer program product.

BACKGROUND

One of the common challenges in enterprise data centers is to correlate software products with real or virtual machines to count license consumption. Compliance regulations make it more and more a strong requirement to always keep track of licenses in use. In practical cases, more and more often complete, large file systems—i.e., shared resources—are mounted to a server for virtual machines and all software available there may be available on all related virtual machines as well. Hence, it is critical to know if a given software has been used and needs to be accounted for license consumption or not.

The problem may even get bigger if certain software products or software product enhancement packages may only be used in a trial period for a predefined time period but not afterwards.

Data center management teams are often confronted with the requirement to physically de-install a software product for a certain endpoint device, if the software product has not been read or used over a longer period of time, in order to reduce license costs.

SUMMARY

According to one aspect of the present invention, a method for software discovery may be provided. The method may comprise scanning an shared resource mounted to an endpoint device—e.g. a shared file system—for identifying installed software on the shared resource for the endpoint device, monitoring a read access to such identified installed software by the endpoint device using a monitoring agent, and marking the installed software as used on the shared resource by the endpoint device using a software asset management unit.

The method may further comprise recording a last time use of the installed software by the endpoint device, and marking the installed software as uninstalled on the endpoint device after a predetermined time after the last time use, i.e., after a predetermined time it was used last time.

According to another aspect of the present invention, a software discovery system may be provided. The software discovery system may comprise a scanning unit adapted for scanning a shared resource mounted to an endpoint device for identifying installed software on the shared resource for the endpoint device, and a monitoring agent module adapted for monitoring a read access to such identified installed software by the endpoint device.

Furthermore, the software discovery system may comprise a software asset management unit adapted for marking the installed software as used on the shared resource by the endpoint device, wherein the software asset management unit is also adapted for recording a last time use of the installed software by the endpoint device, and wherein the software asset management unit is also adapted for marking the installed software as uninstalled on the endpoint device after a predetermined time after the last time use.

It may be noted that the terms 'software' and 'software product' may be used interchangeably throughout this document.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

BRIEF DESCRIPTION OF THE SEVERAL VIEWS OF THE DRAWINGS

It should be noted that embodiments of the invention are described with reference to different subject-matters. In particular, some embodiments are described with reference to method type claims, whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

Figure 1:
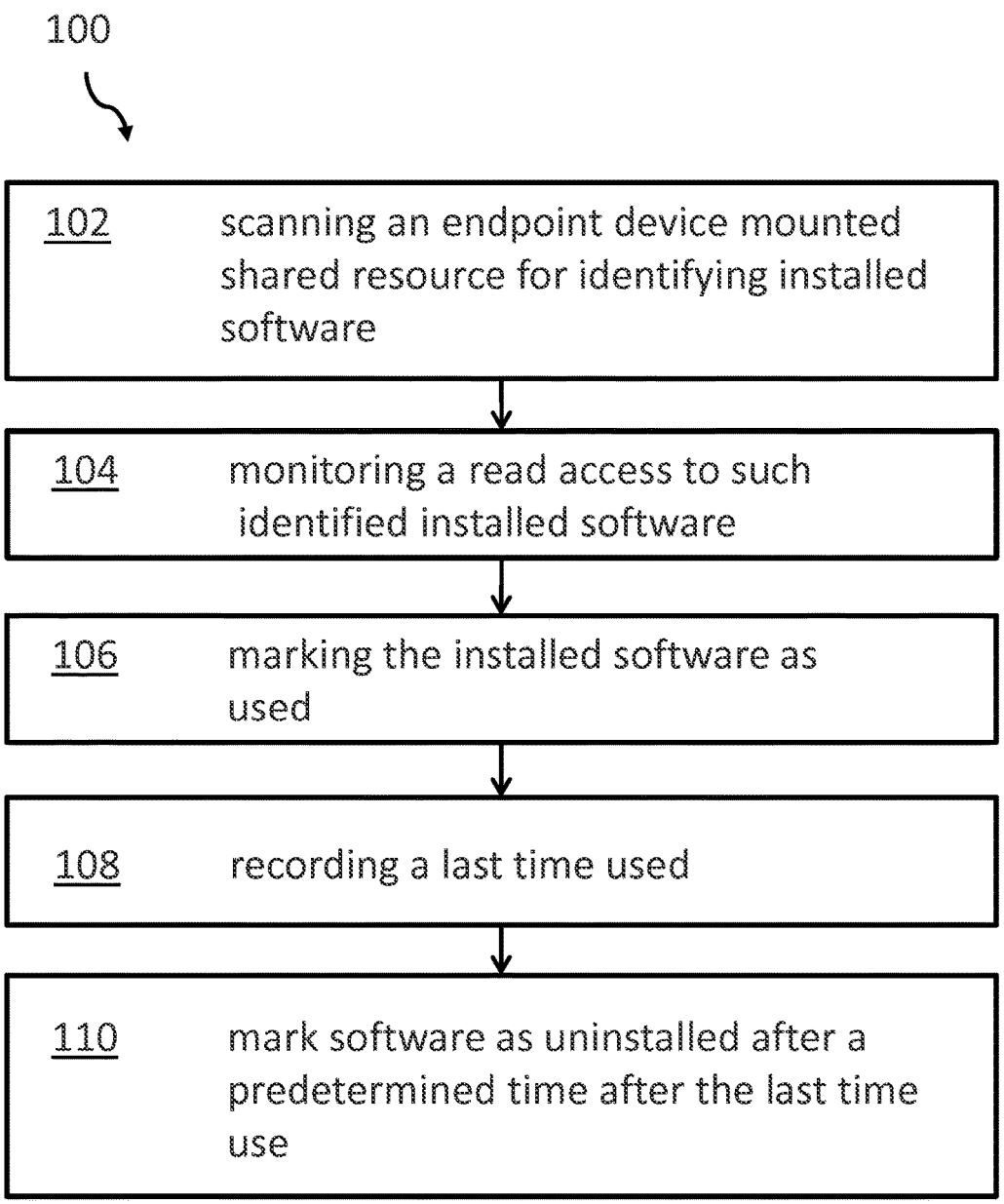

Preferred embodiments of the invention will be described, by way of example only, and with reference to the following drawings:

FIG. 1 shows a block diagram of an embodiment of the method for software discovery according to the invention.

Figure 2:
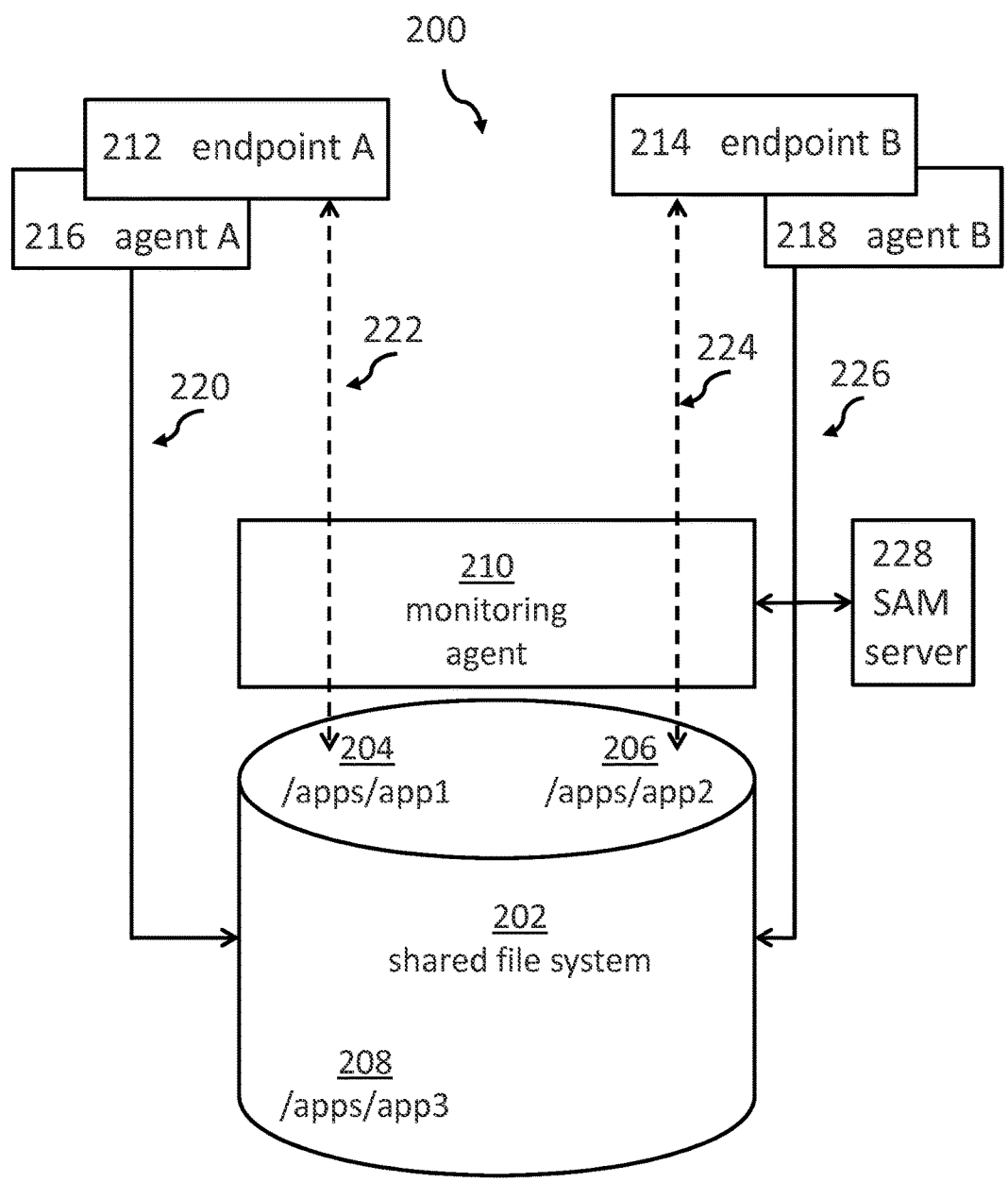

FIG. 2 shows a block diagram of an embodiment of involved systems for the method for software discovery.

Figure 3:
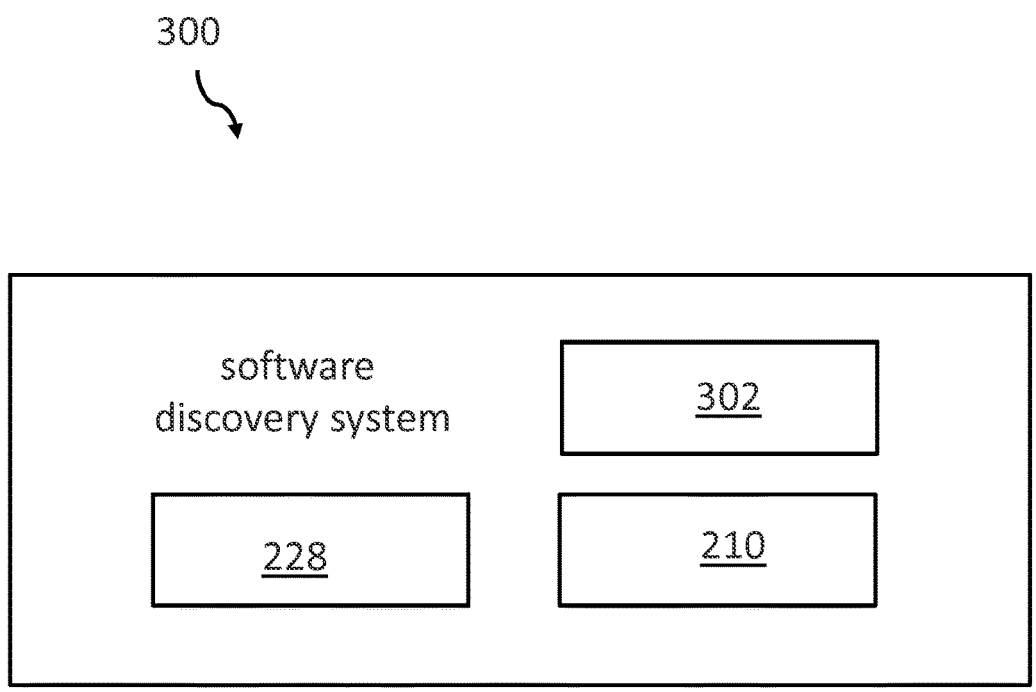

FIG. 3 shows a block diagram of an embodiment of a software discovery system.

Figure 4:
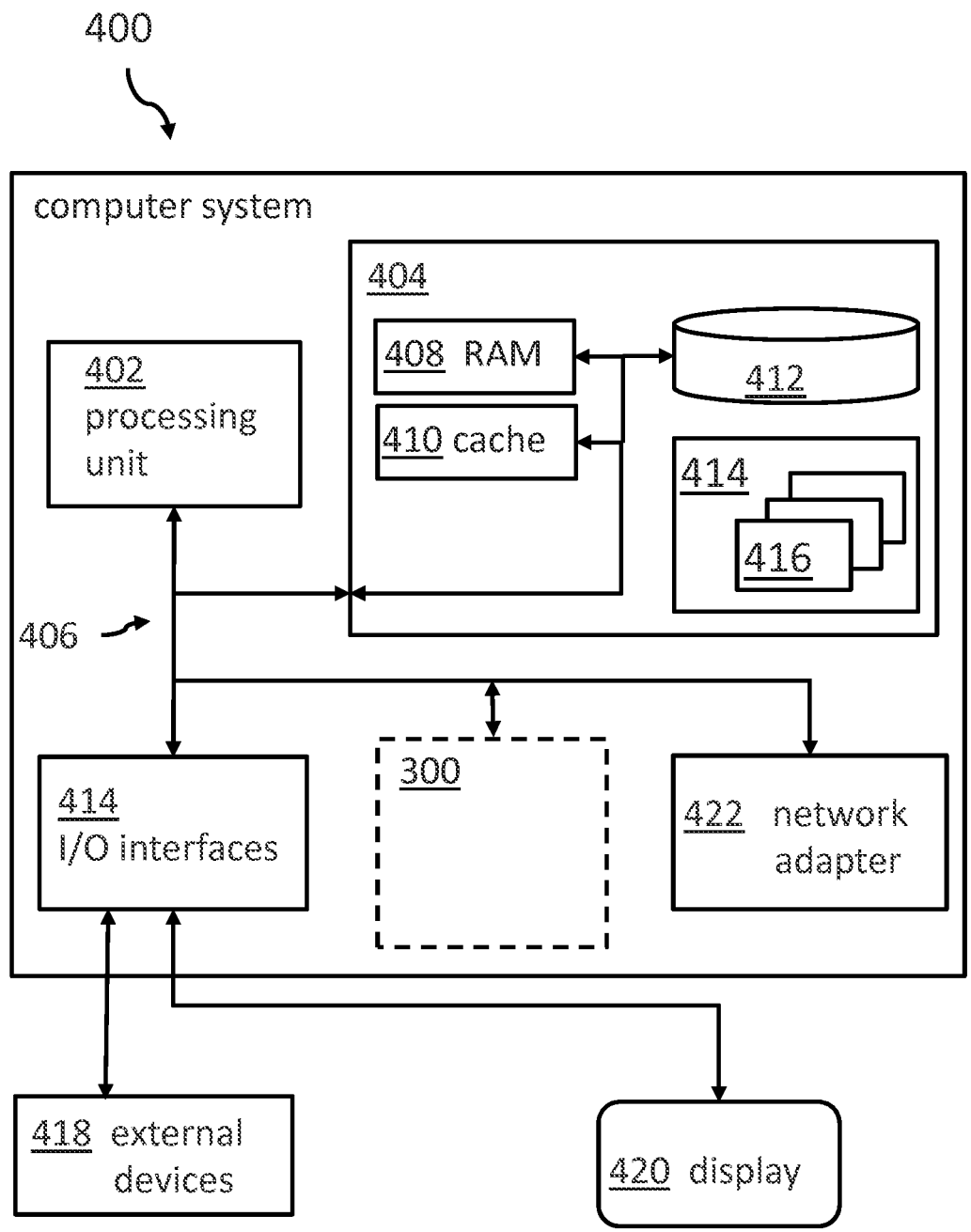

FIG. 4 shows an embodiment of a computing system comprising the software discovery system.

DETAILED DESCRIPTION

In the context of this description, the following conventions, terms and/or expressions may be used:

The term 'software discovery' may denote a process of detecting installed software on a computer system. In large complex software installations, it may be difficult to know at each point in time which software product has been installed on a given computer system. Therefore, software asset management systems comprise components to scan through file systems in order to identify installed software or software products. For a detection, it may not be required that the software is actually used.

The term 'endpoint device' may typically denote a computing system used by an end-user like a PC (personal computer), a tablet computer, a smartphone or any other system that may be designed and prepared to execute application software or middleware software components.

Also, a controller—e.g., a network controller, an I/O controller (input/output), an air condition controller, or any other kind of controller—may be denoted as endpoint device.

The term 'shared resource mounted to an endpoint device' may denote a resource in a computer network which may be shared among different endpoint devices. The shared resource may be a storage system which may be accessed by a plurality of endpoint devices, e.g., PCs. The shared resource may also be a file system, or a part thereof, for storing application programs—or, software or software programs—which may be executed on one or more dedicated endpoint systems. Thus, the software application needs to be stored only once as part on the shared resource, but may be installed on/for different endpoint systems in order to ensure consistency for the application for all endpoint devices and to save local storage capacities on the endpoint devices.

The term 'read access' may denote an access to the shared resource, e.g., a file system, by reading a specific file, e.g., a software application. It may be clear that for each execution of the software at an endpoint device, a read access may be required to the shared resource in order to load the related executable program—at least in parts—into the main memory of the endpoint device. The read accesses may be time-based such that a last time use may be determined.

It may also be enforced that only those read accesses count as real read accesses that are performed by an endpoint device in order to execute the installed software on the endpoint device; i.e., other read accesses like, e.g., those from an anti-virus software or malware scanner or backup read accesses may not be reflected as read access in the sense of the inventive subject-matter.

The term 'software asset management unit' may denote a system comprising components for an automatic management of software. The software may be executable code of a software program, executable middleware or parts thereof, a database including the related database drivers, and/or an information store like a catalog or a dictionary.

It may also be noted that the proposed method for software discovery may be useful in classical computing environments, virtual machine environments, and/or cloud computing environments.

The proposed method for software discovery may offer a couple of advantages and technical effects:

In virtual computing environments—but also in classical computing environments—executable software programs may not be installed on every individual endpoint device. This would require a lot of storage in the endpoint devices and may cause major maintenance efforts if new versions of the software programs would need to be distributed to all physical instances of the endpoint devices. Instead—and if the endpoint devices are more or less equivalent to each other—only one physical copy of an executable program may be stored in a central storage, e.g., a shared file system and may, at the same time, be installed on a dedicated endpoint device. The advantage is that storage for the executable program may only be needed once—on the central file system—such that storage devices for endpoint devices may be smaller and more cost-effective. In addition, maintenance tasks may be performed at one central place for all endpoint devices just once. Moreover, the method may be used for any software, independent of its origin or special connectors. The method may also work for other non-executable data, which access may require license fees.

However, licensing management may become more difficult in such virtualized environments because it may not always be clear which endpoint device may use a specific software component. The present proposed method and system ensure that, on the one hand, a license usage may be tracked, but on the other hand not more license fees may be paid than required because certain endpoint devices may not use the software any longer.

It may be defined that if a software component may not have been used for a predefined amount of time that this software component may be counted as not used by a specific endpoint device. Thus, based on the improved software inventory management, which only requires to define a top installation directory (e.g., by a vocabulary, see below), a potential customer may have to pay license fees only for those software components that are actually used by endpoint devices.

In one preferred embodiment, the method may also comprise recording a first time use of the installed software by the endpoint device, i.e., a timestamp of the first time the installed software was used. Moreover, every access to the installed software product may be tracked and recorded. Hence, not only the last access to the software product or components thereof and the first access may be detected and protocolled, but also all accesses, i.e. usages, may be measured such that a complete accesses history may be available for analysis.

According to one additionally preferred embodiment of the method, the installed software is a component of an end-user software product or a component of a middleware software product, such as a database, a communication program, message oriented middleware or the like, as known by a skilled person. This may be a typical use case because operating systems may be installed on endpoint systems anyway. However, application programs may be installed on the shared device in order to reduce maintenance efforts and ensure a consistent software installation landscape.

According to one optional embodiment of the method, the installed software may be a component of a data collection. This may include catalogs, dictionaries, recipes, and/or any other data collection, in particular those for which license payments may be required. This way, not only application software may be tracked, but also access to centrally installed, fee-based information resources.

According to one permissive embodiment of the method, the monitoring may be performed by monitoring a communication connection. The communication connection may comprise any technically feasible information exchange network—like a wired network, a wireless network, a fiber network, or any combination thereof—between the endpoint device and the shared resource. The task to identify the right place in the network or the related components for the monitoring may be solved by embedding a monitoring component into a shared file system controller. This may be particularly useful in case the storage is done in an encrypted way. A typical protocol for the communication connection may be based on TCP/IP. A skilled person will know how to use other protocols.

Consequently, according to one advantageous embodiment of the method, the shared resource may be a network attached storage—actually, any kind of shared storage may be used. Alternatively, the shared resource may be a server with an attached storage system. Practically, there are no limitations to the kind of the shared resource. It may also be possible that an endpoint device may comprise a shared resource in a peer-to-peer network. In such a case, a group of endpoint devices of the peer-to-peer network may store a group of software program products to be used by the other endpoint devices of the peer-to-peer network. This way, each endpoint device may be responsible for another software program product used by other endpoint devices in the peer-to-peer network.

According to one allowable embodiment of the method, the endpoint device may be a usual computing system, like a PC, a mobile device, like a smartphone, a tablet computer, notebook computer, as well as a controller and an industrial environment or a sensor controller as used in an 'Internet of Things' environment. The term endpoint device may be interpreted broadly. Also, a network controller, a smart TV, a home entertainment system and the like may be termed endpoint device.

According to one advantageous embodiment of the method, the scanning may be performed by a designated agent being executed by the endpoint device. This way, there may be no network traffic during the local scanning process and a summary report by the designated agent being executed on the endpoint device may be transferred to a central server, e.g., a software asset management system.

Furthermore, and according to one optional embodiment of the method, a vocabulary may be provided for a mapping a software product identification to a storage path of the related software product. Thus, the installed software products to be tracked may be identified easily, even if they may not be installed in a generally agreed or recommended subdirectory of a shared file system. The vocabulary may be instrumental in linking a software product identification to an individual storage path for a specific shared file system. Thus, the monitoring and recording the usage of specific installed software programs may be performed nearly effortlessly for the involved systems.

Hence, and according to a further advantageous embodiment of the method, the monitoring the read access may be performed by identifying a read access path in a file-system of the access to the software product and detecting a read access to software components also in subdirectories of the access path in the file system. This may reflect the fact that installed software programs may not only be stored in one consistent consecutive single file, but very often as a bunch of executable independent components in different subdirectories.

In the following, a detailed description of the figures will be given. All instructions in the figures are schematic. Firstly, a block diagram of an embodiment of the inventive method for software discovery is given. Afterwards, further embodiments as well as embodiments of the software discovery system will be described.

FIG. 1 shows a block diagram of an embodiment of the inventive method 100 for software discovery. The method for software discovery—in particular, in a virtual machine environment comprises scanning, 102, e.g., by a designated agent, a shared resource mounted to an endpoint device—e.g., shared file system on a shared storage system—for identifying installed software, in particular installed software programs or middleware components on the shared resource for the endpoint device, monitoring 104, a read access to such identified installed software by the endpoint device using a monitoring agent. The software product itself may be installed for the endpoint device on a shared resource, e.g., a shared storage comprising a shared file system. Additionally, the method 100 comprises marking, 106, the installed software as used on the shared resource by the endpoint device. For this, a software asset management unit—or software asset management system (SAM)—may be used.

Next, the method comprises recording, 108, a last time use—i.e., the time of a last usage—of the installed software by the endpoint device. Additionally, the installed software program may be marked, 110, as uninstalled on the endpoint device after a predetermined time after the last time use. i.e., a predetermined time after the time the software has been used the last time. This may be done by identifying a read access to the directory in the file system in which the software is installed. Additionally, a read access to subdirectories may also be counted a read access to the installed software product.

It may be useful that the monitoring agent and the software asset management unit may be in communicative contact such that the monitoring agent transfers a last time use value of an installed software to the monitoring software asset management unit.

FIG. 2 shows a block diagram of an embodiment 200 of involved systems for the method for software discovery. As examples of endpoint devices, endpoint device A, 212 and endpoint device B, 214 are shown. On each of these two endpoint devices 212, 214, designated agents—agent A, 216 and agent B, 218—may be installed and executed with a function discussed above. Firstly, the shared resource, e.g., the shared file system 202, may be scanned, 220, 226 on the designated endpoints 212, 214 to collect information about installed software. A group of potential software products like /apps/app1 204, /apps/app2 206 and /apps/app3 208 are shown as part of the shared file system 202.

In operation, the endpoint devices 202, 214 may access, 222, 224, the software applications on the shared file system. It may be noted that these applications may be installed for usage by the endpoints 212, 214. The third software application/apps/app3 may be stored as part of the shared resource/shared file system 202, but it may not be installed for a usage by any of the shown endpoint devices 212, 214. However, it may be installed for a third endpoint device. When a specific software application, e.g., /apps/app1 may be executed, 222 (224 for endpoint device B, 214) by, e.g., endpoint device 212, the monitoring agent 210 detects this access by monitoring, e.g., a communication channel between the endpoint device a, 212 and the shared resource/shared file system 202. A vocabulary on the software asset management server 228 may be instrumental for the monitoring agent to identify and access to a specific software application 204, 206, 208 by a dedicated endpoint device 212, 214.

As discussed above, the monitoring agent 210 may record a last access time for a read access of, e.g., endpoint device A 212. After a predetermined amount of time, the monitoring agent marks the software application—here /apps/app1 as not used by endpoint device 212, and thus, uninstalled. This way, software products may be marked uninstalled in his software asset management server 228 if they have not been used for a long time simulating a situation in which the software program /apps/app1 may have been de-installed for the endpoint device A 212. This way, a clever license management with a reduced human interaction effort may be implemented.

FIG. 3 shows a block diagram of an embodiment of a software discovery system 300. The software discovery system comprises a scanning agent 302 adapted for scanning a shared resource mounted to an endpoint device for identifying installed software on the shared resource for the endpoint device and a monitoring agent 210 module adapted for monitoring a read access to such identified installed software by the endpoint device 212, 214.

Additionally, the software discovery system 300 comprises a software asset management unit 228 adapted for marking the installed software as used on the shared resource 202 by the endpoint device 212, 214, wherein the software asset management unit 228 is also adapted for recording a last time use of the installed software by the endpoint device, and wherein the software asset management unit is also adapted for marking the installed software as uninstalled on the endpoint device 212, 214 after a predetermined time after the last time use. It may be useful that the monitoring agent module 210 informs the software asset management unit 228 about a read access to the installed software on the shared resource 202. Embodiments of the invention may be implemented together with virtually any type of computer, regardless of the platform being suitable for storing and/or executing program code. FIG. 4 shows, as an example, a computing system 400 suitable for executing program code related to the proposed method.

The computing system 400 is only one example of a suitable computer system and is not intended to suggest any limitation as to the scope of use or functionality of embodiments of the invention described herein. Regardless, computer system 400 is capable of being implemented and/or performing any of the functionality set forth hereinabove. In the computer system 400, there are components, which are operational with numerous other general purpose or special purpose computing system environments or configurations. Examples of well-known computing systems, environments, and/or configurations that may be suitable for use with computer system/server 400 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 400 may be described in the general context of computer system-executable instructions, such as program modules, being executed by a computer system 400. Generally, program modules may include routines, programs, objects, components, logic, data structures, and so on that perform particular tasks or implement particular abstract data types. Computer system/server 400 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 400 is shown in the form of a general-purpose computing device. The components of computer system/server 400 may include, but are not limited to, one or more processors or processing units 402, a system memory 404, and a bus 406 that couples various system components including system memory 404 to the processor 402. Bus 406 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 400 typically includes a variety of computer system readable media. Such media may be any available media that is accessible by computer system/server 400, and it includes both, volatile and non-volatile media, removable and non-removable media.

The system memory 404 may include computer system readable media in the form of volatile memory, such as random access memory (RAM) 408 and/or cache memory 410. Computer system/server 400 may further include other removable/non-removable, volatile/non-volatile computer system storage media. By way of example only, storage system 412 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 406 by one or more data media interfaces. As will be further depicted and described below, memory 404 may include at least one program product having a set (e.g., at least one) of program modules that are configured to carry out the functions of embodiments of the invention.

Program/utility 414, having a set (at least one) of program modules 416, may be stored in memory 404 by way of example, and not limitation, as well as an operating system, one or more application programs, other program modules, and program data. Each of the operating system, one or more application programs, other program modules, and program data or some combination thereof, may include an implementation of a networking environment. Program modules 416 generally carry out the functions and/or methodologies of embodiments of the invention as described herein.

The computer system/server 400 may also communicate with one or more external devices 418 such as a keyboard, a pointing device, a display 420, etc.; one or more devices that enable a user to interact with computer system/server 400; and/or any devices (e.g., network card, modem, etc.) that enable computer system/server 400 to communicate with one or more other computing devices. Such communication can occur via Input/Output (I/O) interfaces 414. Still yet, computer system/server 400 may communicate with one or more networks such as a local area network (LAN), a general wide area network (WAN), and/or a public network (e.g., the Internet) via network adapter 422. As depicted, network adapter 422 may communicate with the other components of computer system/server 400 via bus 406. It should be understood that although not shown, other hardware and/or software components could be used in conjunction with computer system/server 400. Examples, include, but are not limited to: microcode, device drivers, redundant processing units, external disk drive arrays, RAID systems, tape drives, and data archival storage systems, etc.

Additionally, software: discovery system 300 may be attached to the bus system 406.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions ma be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a," "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A method for software discovery, said method comprising:
    scanning, via a designated agent, a shared resource mounted to an endpoint device for identifying installed software on said shared resource for said endpoint device, the endpoint device comprising a computing system designed and prepared to execute said installed software, said shared resource mounted to the endpoint device comprising a resource in a computer network, said resource being shared among different endpoint devices, said shared resource comprising a file system for storing the installed software, the designated agent being executed locally by the endpoint device so that no network traffic occurs during the scanning,
    monitoring a read access to such identified installed software by said endpoint device using a monitoring agent,
    marking said installed software as used on said shared resource by said endpoint device using a software asset management unit,
    recording a last time use of said installed software by said endpoint device, and
    marking said installed software as uninstalled on said endpoint device after a predetermined time after said last time use; and wherein
    said monitoring said access is performed by identifying a read access path in said file system of said access to said software product and detecting a read access to software components in subdirectories of said access path in said file system; and,
    said designated agent being executed by said endpoint device transfers a summary report of said scanning to a central server.

2. The method according to claim 1, also comprising: recording a first time use of said installed software by said endpoint device.

3. The method according to claim 1, wherein said installed software is a component of end-user software or a component of middleware software.

4. The method according to claim 1, wherein said installed software is a component of a data collection.

5. The method according to claim 1, wherein said monitoring is performed by monitoring a communication connection between said endpoint device and said shared resource.

6. The method according to claim 1, wherein said shared resource is a network attached storage.

7. The method according to claim 1, wherein said shared resource is a server with an attached storage system.

8. The method according to claim 1, wherein said endpoint device is selected out of the group comprising a computing system, a mobile device, a controller.

9. The method according to claim 1, wherein a vocabulary is provided for a mapping a software product identification to a storage path of said software product.

10. A software discovery system, said software discovery system comprising:
    a scanning unit adapted for scanning a shared resource mounted to an endpoint device for identifying installed software on said shared resource for said endpoint device, the endpoint device comprising a computing system designed and prepared to execute said installed software, said shared resource mounted to the endpoint device comprising a resource in a computer network, said resource being shared among different endpoint devices, said shared resource comprising a file system for storing the installed software, the scanning unit comprising a designated agent, the designated agent being executed locally by the endpoint device so that no network traffic occurs during the scanning,
    a monitoring agent module adapted for monitoring a read access to such identified installed software by said endpoint device,
    a software asset management unit adapted for marking said installed software as used on said shared resource by said endpoint device, wherein said software asset management unit is also adapted for recording a last time use of said installed software by said endpoint device, and wherein said software asset management unit is also adapted for marking said installed software as uninstalled on said endpoint device after a predetermined time after said last time use; and wherein
    said monitoring agent unit is adapted for identifying a read access path in a file system of said access to said software product and detecting a read access to software components in subdirectories of said access path in said file system; and,
    said designated agent being executed by said endpoint device transfers a summary report of said scanning to a central server.

11. The software discovery system according to claim 10, wherein said software asset management unit is also adapted for recording a first time use of said installed software by said endpoint device.

12. The software discovery system according to claim 10, wherein said installed software is a component of end-user software or a component of middleware software.

13. The software discovery system according to claim 10, wherein said installed software is a component of a data collection.

14. The software discovery system according to claim 10, wherein said monitoring agent module is adapted for monitoring a communication connection between said endpoint device and said shared resource for monitoring said access to such identified installed software.

15. The software discovery system according to claim 10, wherein said shared resource is a network attached storage or a server with an attached storage system.

16. The software discovery system according to claim 10, wherein said endpoint device is selected out of the group comprising a computing system, a mobile device, a controller.

17. A computer program product for a software discovery, said computer program product comprising a computer readable storage medium having program instructions embodied therewith, said program instructions being executable by one or more computing devices to cause said one or more computing devices to:

scanning, via a designated agent, a shared resource mounted to an endpoint device for identifying installed software on said shared resource for said endpoint device, the endpoint device comprising a computing system designed and prepared to execute said installed software, said shared resource mounted to the endpoint device comprising a resource in a computer network, said resource being shared among different endpoint devices, said shared resource comprising a file system for storing the installed software, the designated agent being executed locally by the endpoint device so that no network traffic occurs during the scanning, monitoring a read access to such identified installed software by said endpoint device using a monitoring agent, marking said installed software as used on said shared resource by said endpoint device using a software asset management unit, recording a last time use of said installed software by said endpoint device, and marking said installed software as uninstalled on said endpoint device after a predetermined time after said last time use; and wherein said monitoring said access is performed by identifying a read access path in a file system of said access to said software product and detecting a read access to software components in subdirectories of said access path in said file system; and, said designated agent being executed by said endpoint device transfers a summary report of said scanning to a central server.

\* \* \* \* \*